US012789091B2

(12) United States Patent
Zhu et al.

(10) Patent No.: US 12,789,091 B2
(45) Date of Patent: Nov. 10, 2026

(54) VIRTUAL SKILL CONTROL METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventors: Chen Zhu, Shenzhen (CN); Jingjing Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 562 days.

(21) Appl. No.: 18/199,243

(22) Filed: May 18, 2023

(65) Prior Publication Data

US 2023/0285858 A1 Sep. 14, 2023

Related U.S. Application Data

(63) Continuation of application No. PCT/CN2022/100558, filed on Jun. 22, 2022.

(30) Foreign Application Priority Data

Jul. 27, 2021 (CN) ......................... 202110853143.7

(51) Int. Cl.
*A63F 13/5372* (2014.01)
*A63F 13/533* (2014.01)
(Continued)

(52) U.S. Cl.
CPC ........ *A63F 13/5372* (2014.09); *A63F 13/533* (2014.09); *A63F 13/5378* (2014.09); *A63F 13/79* (2014.09); *A63F 13/822* (2014.09)

(58) Field of Classification Search
CPC ................ A63F 13/5372; A63F 13/533; A63F 13/5378; A63F 13/79; A63F 13/822
See application file for complete search history.

(56) References Cited

U.S. PATENT DOCUMENTS 6,368,210 B1 * 4/2002 Toyohara .............. A63F 13/577
463/43
2013/0344953 A1 12/2013 Yoshikawa
(Continued)

FOREIGN PATENT DOCUMENTS

CN 109568965 A 4/2019
CN 109865286 A 6/2019
(Continued)

OTHER PUBLICATIONS

Final Fantasy Tactics. Wikipedia.org. Online. Accessed via the Internet. Accessed Sep. 5, 2025. <URL: https://en.wikipedia.org/wiki/Final_Fantasy_Tactics> (Year: 2025).*
(Continued)

*Primary Examiner* — Carl V Larsen
(74) *Attorney, Agent, or Firm* — Morgan, Lewis & Bockius LLP

(57) ABSTRACT

This application provides a virtual skill control method and apparatus, a device, a computer-readable storage medium, and a computer program product. The method includes: presenting a region map of a virtual scene, and presenting at least one virtual object having target skills, the at least one virtual object including a target virtual object, and the target skills being castable skills in the region map; and controlling, in response to a target skill casting instruction of the target virtual object for a target region in the region map, a target skill indicated by the target skill casting instruction to be cast in the target region and to act on an object in the target region.

17 Claims, 9 Drawing Sheets

(51) Int. Cl.
*A63F 13/5378* (2014.01)
*A63F 13/79* (2014.01)
*A63F 13/822* (2014.01)

(56) References Cited

U.S. PATENT DOCUMENTS

| | | | | |
|---|---|---|---|---|
| 2017/0216720 | A1* | 8/2017 | Colenbrander | A63F 13/493 |
| 2018/0043260 | A1* | 2/2018 | Tang | A63F 13/822 |
| 2018/0147488 | A1* | 5/2018 | Tang | A63F 13/422 |
| 2018/0369693 | A1* | 12/2018 | Rong | A63F 13/92 |
| 2019/0366213 | A1* | 12/2019 | Zhou | A63F 13/533 |
| 2022/0080299 | A1* | 3/2022 | Huang | A63F 13/537 |
| 2022/0080314 | A1* | 3/2022 | Zhang | A63F 13/53 |
| 2022/0134231 | A1* | 5/2022 | Ohashi | A63F 13/35 463/31 |
| 2023/0182018 | A1* | 6/2023 | Kano | A63F 13/5375 463/31 |
| 2024/0066414 | A1* | 2/2024 | Xue | A63F 13/533 |

FOREIGN PATENT DOCUMENTS

| | | | |
|---|---|---|---|
| CN | 110812838 | A | 2/2020 |
| CN | 111494935 | A | 8/2020 |
| CN | 111589140 | A | 8/2020 |
| CN | 111589142 | A | 8/2020 |
| CN | 112426715 | A | 3/2021 |
| CN | 112691367 | A | 4/2021 |
| CN | 113559510 | A | 10/2021 |
| WO | WO 2020103367 | A1 | 5/2020 |

OTHER PUBLICATIONS

Final Fantasy Tactics. Playstation Manual. 1998. Accessed via the Internet. Accessed Sep. 5, 2025. <URL: https://bdjogos.com.br/manuais/529-final-fantasy-tactics-playstation-manual-usa.pdf> (Year: 1998).*

Final Fantasy Tactics (PSX) Complete Playthrough. Youtube.com. Online. Oct. 30, 2018. Accessed via the Internet. Accessed Sep. 5, 2025. <URL: https://www.youtube.com/watch?v=F97NSY2Il1E> (Year: 2018).*

Final Fantasy Tactics—Jobs/Abilities Chart. Gamefaqs.com. Online. Aug. 5, 2003. Accessed via the Internet. Accessed Sep. 5, 2025. <URL: https://gamefaqs.gamespot.com/ps/197339-final-fantasy-tactics/faqs/3859#:~:text=Name:%20The%20skill%27s%20name.,them)%20will%20be%20removed.%20%2D> (Year: 2003).*

Can you seriously not exchange weapons between characters? Gamefaqs.com. Online. Jan. 15, 2009. Accessed via the Internet. Accessed Sep. 5, 2025 <URL: https://gamefaqs.gamespot.com/boards/935684-white-knight-chronicles-international-edition/47666433> (Year: 2009).*

Disable movement from map clicks? Reddit.com. Online. Mar. 26, 2017. Accessed via the Internet. Accessed Mar. 20, 2026. <URL: https://www.reddit.com/r/leagueoflegends/comments/6dgzx5/disable_movement_from_map_clicks/> (Year: 2017).*

Rox Pray Ashe Cross Map Arrow on Duke Ekko! Youtube.com. Online Oct. 21, 2016. Accessed via the Internet. Accessed Mar. 20, 2026. <URL: https://www.youtube.com/watch?v=p8rSJ4gNH7g> (Year: 2016).*

Ashe Ult and mini map question. Gamefaqs.com. Online. Jul. 15, 2014. Accessed via the Internet Accessed Mar. 20, 2026. <URL: https://gamefaqs.gamespot.com/boards/954437-league-of-legends/69651757> (Year: 2015).*

You can see Ashe Arrow on the map now too! Reddit.com. Online. Feb. 1, 2012. Accessed via the Internet. Accessed Mar. 20, 2026. <URL: https://www.reddit.com/r/leagueoflegends/comments/p75w0/you_can_see_ashe_arrow_on_the_map_now_too/> (Year: 2012).*

Tencent Technology, WO, PCT/CN2022/100558, Sep. 21, 2022, 5 pgs.

Tencent Technology, IPRP, PCT/CN2022/100558, Jan. 18, 2024, 6 pgs.

Tencent Technology, ISR, PCT/CN2022/100558, Sep. 21, 2022, 3 pgs.

* cited by examiner

VIRTUAL SKILL CONTROL METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/100558, entitled "VIRTUAL SKILL CONTROL METHOD AND APPARATUS, DEVICE, STORAGE MEDIUM, AND PROGRAM PRODUCT" filed on Jun. 22, 2022, which claims priority to Chinese Patent Application No. 202110853143.7, entitled "VIRTUAL SKILL CONTROL METHOD AND APPARATUS, DEVICE, STORAGE MEDIUM, AND PROGRAM PRODUCT" filed on Jul. 27, 2021, all of which is incorporated by reference in its entirety.

FIELD OF THE TECHNOLOGY

This application relates to a computer technology and a human-computer interaction technology, and in particular, to a virtual skill control method and apparatus, a device, a computer-readable storage medium, and a computer program product.

BACKGROUND OF THE DISCLOSURE

In most virtual scene applications, such as games, a region map is used for displaying a local region or a global region of a virtual scene. A player may view the position of each virtual object in the virtual scene through the region map, or learn an interaction result of the virtual scene macroscopically, such as building a city in a certain region of the region map. Thus, the display content of the region map is single and uninteresting, resulting in low viscosity of users to the virtual scene and low retention rate.

In the related art, the virtual object may be controlled to cast virtual skills in the virtual scene. However, since these virtual skills belong to intra-battle skills, the skills can only take effect in a virtual battle of the virtual scene. If the virtual object wants to cast skills in other regions except the current region, it is necessary to first determine a region where the skills are cast in a map, and then control the virtual object to move to the region in the virtual scene, thereby casting the virtual skills. The number of human-computer interactions is large, and the efficiency of human-computer interactions is low, thus resulting in a long process of battling, and low utilization of hardware resources.

SUMMARY

Embodiments of this application provide a virtual skill control method and apparatus, a device, a computer-readable storage medium, and a computer program product, which can enrich the display content of a region map and improve human-computer interaction efficiency and hardware resource utilization.

Technical solutions in the embodiments of this application are implemented as follows.

An embodiment of this application provides a virtual skill control method performed by an electronic device, the method including:

- displaying a region map of a virtual scene;
- displaying at least one virtual object having target skills in the region map, the at least one virtual object comprising a target virtual object; and
- in response to a target skill casting instruction of the target virtual object for a target region in the region map, controlling a target skill indicated by the target skill casting instruction to be cast in the target region and to act on at least one virtual object in the target region.

An embodiment of this application provides an electronic device, including:

- a memory, configured to store executable instructions; and
- a processor, configured to implement, when executing the executable instructions stored in the memory, the virtual skill control method according to the foregoing embodiment of this application.

An embodiment of this application provides a non-transitory computer-readable storage medium, storing executable instructions for implementing, when executed by a processor, the virtual skill control method according to the foregoing embodiment of this application.

An embodiment of this application also provides a computer program product, including computer programs or instructions. The computer programs or instructions, when executed by a processor, implement the virtual skill control method according to the foregoing embodiment of this application.

The embodiments of this application have the following beneficial effects.

A terminal presents a region map of a virtual scene, and presents at least one virtual object having target skills. The terminal controls, in response to a target skill casting instruction of the target virtual object for a target region in the region map, a target skill indicated by the target skill casting instruction to be cast in the target region and to act on an object in the target region. Thus, since the target skills are castable skills in the region map, the target skills may be controlled to be cast in the target region included in the region map. Thus, the virtual object can selectively and accurately cast skills in the region map according to a region displayed in the region map, thereby enriching skill casting modes, simplifying a skill casting process, and improving human-computer interaction efficiency and hardware resource utilization. The target skills are castable in the region map, and the cast skilled can act on the object in the target region. That is, when the target virtual object uses the virtual skill to interact with the target object in the target region, the interaction process can be displayed in the region map. Also, compared with only displaying a relative position of the virtual object in the region map or presenting an interaction result instantaneously, the display content of the region map is greatly enriched, the interest of the interaction based on the region map is improved, and the viscosity and retention rate of users for the virtual scene are advantageously improved.

DESCRIPTION OF EMBODIMENTS

Figure 1:
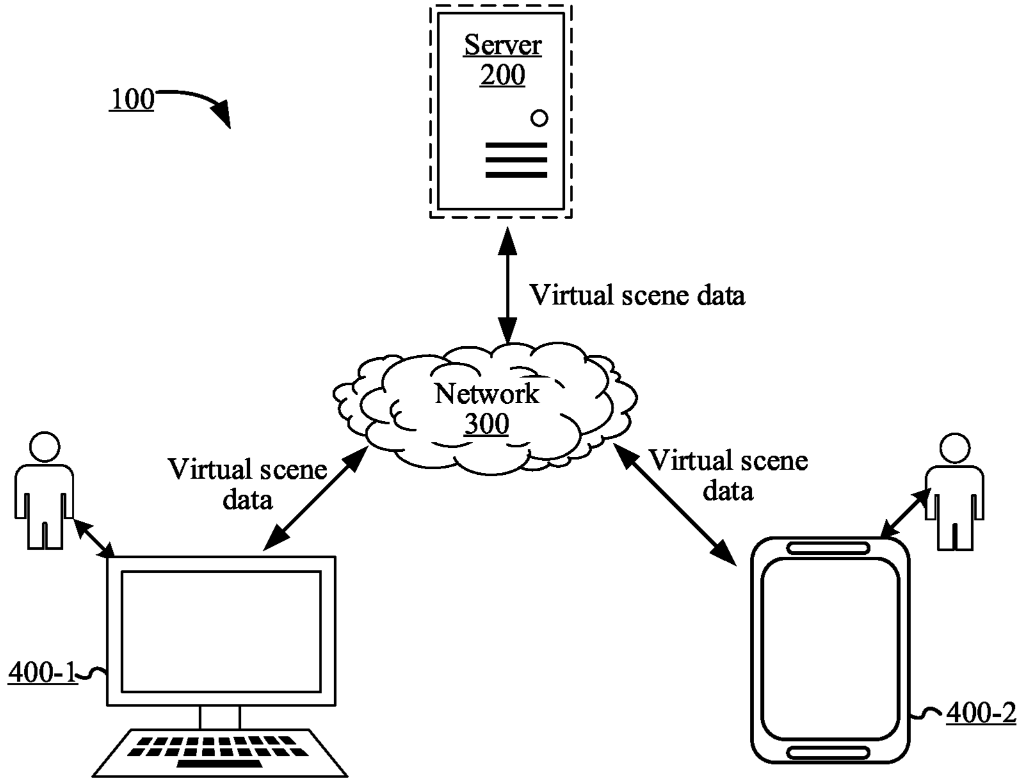
FIG. 1 is a schematic architectural diagram of a virtual skill control system 100 according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, reference is made to "some embodiments" which describe a subset of all possible embodiments. However, it is to be understood that "some embodiments" may be the same subset or different subsets of all possible embodiments and may be combined with each other without conflict.

The term "first/second" involved in the following description is only for distinguishing between similar objects and does not represent a particular sequence of the objects. It may be understood that "first/second" may be interchanged to particular sequences or orders if allowed to implement the embodiments of this application described herein in sequences other than that illustrated or described herein.

Unless otherwise defined, meanings of all technical and scientific terms used in this specification are the same as those usually understood by a person skilled in the art to which this application belongs. The terms used in this specification are for the purpose of describing the embodiments of this application only and are not intended to be limiting of this application.

Before the embodiments of this application are further described in detail, a description is made on nouns and terms in the embodiments of this application, and the nouns and terms in the embodiments of this application are applicable to the following explanations.

1) Client: an application that is run in a terminal for providing various services, such as a video playing client or a game client.

2) Response: representing a condition or state upon which performed operations depend, where one or more of the performed operations may be real-time or may have a set delay when the dependent condition or state is satisfied. Without being specifically stated, there is no limitation to the order in which the operations are performed.

3) Virtual scene: a virtual scene displayed (or provided) when the application is run on the terminal, where the virtual scene may be a real-world simulation environment, a semi-simulation semi-fictional virtual environment, or a purely-fictional virtual environment. The virtual scene may be any one of a two dimension virtual scene, a 2.5-dimension virtual scene, or a three dimension virtual scene. The dimension of the virtual scene is not limited in the embodiments of this application.

For example, when the virtual scene is a three dimension virtual space, the three dimension virtual space may be an open space. The virtual scene may be used for simulating a real environment in reality. For example, the virtual scene may include a sky, a land, a sea, and the like. The land may include environmental elements such as a desert or a city. Certainly, the virtual scene may further include virtual items, for example, buildings, vehicles, and props such as virtual weapons required by the virtual object in the virtual scene for arming the virtual object or for performing a virtual combat with other virtual objects. The virtual scene may further be configured to simulate a real environment in different weathers, for example, sunny, rainy, foggy, or dark weather. A user may control the movement of the virtual object in the virtual scene.

4) Virtual object: an image of various people and things that may interact in the virtual scene, or a movable object in the virtual scene. The movable object may be a virtual character, a virtual animal, a cartoon character, a virtual prop, or the like, for example, a character, an animal, a plant, a prop, an oil bucket, a wall, a stone, or the like displayed in the virtual scene. The virtual object may be a virtual image in the virtual scene representing the user. A plurality of virtual objects may be included in the virtual scene. Each virtual object has own shape and volume in the virtual scene, and occupies a portion of the space in the virtual scene.

For example, the virtual object may be a player character controlled by an operation on the client, an artificial intelligence (AI) set in a virtual scene battle by training, or a non-player character (NPC) set in a virtual scene interaction. In some embodiments, the virtual object may be a virtual character that performs adversarial interactions in the virtual scene. In some embodiments, the number of virtual objects participating in the interaction in the virtual scene may be preset or dynamically determined according to the number of clients participating in the interaction.

5) Region map: a world map corresponding to a global region of the virtual scene operated by the terminal, or a local map corresponding to a partial region of the virtual scene, composed of a plurality of regions or blocks. In the related art, when virtual objects interact with each other, each player can macroscopically learn a relative position between the virtual objects and an interaction result of the virtual scene through a region map, but cannot view a specific interaction process through the region map. For example, with regard to the interaction process in which virtual object A attacks and finally occupies region 1, only a final result that region 1 is occupied is displayed on the region map, while the specific process in which virtual object A occupies region 1 cannot be displayed in the region map, because a virtual skill or a virtual prop used in the interaction of the related art belongs to an intra-battle skill or an intra-battle prop, which can only take effect in a battle and cannot be cast in the region map. That is, the interaction process can only be displayed in a scene picture of the virtual scene. Therefore, these virtual skills only affect both sides in the closed battle, while the region map cannot display an interaction picture in the battling process of both sides.

However, the embodiments of this application provide a target skill which can be used or used effectively in a region map. The target skill is bound with the region map, operation control is performed on the target skill from the level of the region map, and a casting process of the target skill may be displayed on the region map. For example, a virtual object team moving on the region map may use the target skill, and a casting picture of the target skill may be displayed on the region map in real time.

Referring to FIG. 1, FIG. 1 is a schematic architectural diagram of a virtual skill control system 100 according to an embodiment of this application. In order to support an exemplary application, a terminal (exemplarily, terminal 400-1 and terminal 400-2) is connected to a server 200 via a network 300. The network 300 may be a wide area network or a local area network, or a combination of both. Data transmission is realized by using wireless or wired links.

The terminal may be various types of user terminals such as a smartphone, a tablet computer, or a notebook computer, and may also be a desktop computer, a game machine, a television set, or a combination of any two or more of these data processing devices. The server 200 may be a server separately configured to support various services, or may be configured as a server cluster, or may be a cloud server.

In practical applications, the terminal is installed and runs an application supporting a virtual scene. The application may be any one of a card game or a real-time strategy (RTS) game, a two dimension (2D) game application, a three dimension (3D) game application, a virtual reality application, and a three dimension map program. The application may also be a stand-alone application, such as a stand-alone 3D game program.

An electronic game scene is taken as an exemplary scene. A user may perform an operation on the terminal in advance. The terminal may download a game configuration file of an electronic game after detecting the operation of the user. The game configuration file may include an application of the electronic game, interface display data or virtual scene data, and the like, so that the user (or player) may invoke the game configuration file to render and display an electronic game interface when logging into the electronic game on the terminal. The user may perform a touch operation on the terminal. After detecting the touch operation, the terminal may transmit an obtaining request of game data corresponding to the touch operation to a server. The server determines the game data corresponding to the touch operation based on the obtaining request, and returns the game data to the terminal. The terminal renders and displays the game data. The game data may include virtual scene data, behavior data of a virtual object in the virtual scene, and the like.

In practice, the terminal presents a region map of a virtual scene, and presents at least one virtual object having target skills. The at least one virtual object includes a target virtual object. The target skills are castable skills in the region map. In response to a target skill casting instruction of the target virtual object for a target region in the region map, a target skill indicated by the target skill casting instruction is controlled to be cast in the target region, and acts on an object in the target region.

In actual implementation, the terminal presents a region map of a virtual scene, and presents at least one virtual object having target skills. The target skills are castable skills in a region included in the region map. In response to a trigger operation for a target virtual object (such as a simulated combatant) in the at least one virtual object, a skill control corresponding to at least one target skill possessed by the target virtual object is presented. When a target skill casting instruction is received based on a target skill control among the presented skill controls, a target skill corresponding to the control target skill control is controlled to be cast in a target region, and acts on an object (such as a simulated enemy or a simulated building) in the target region.

Figure 2:
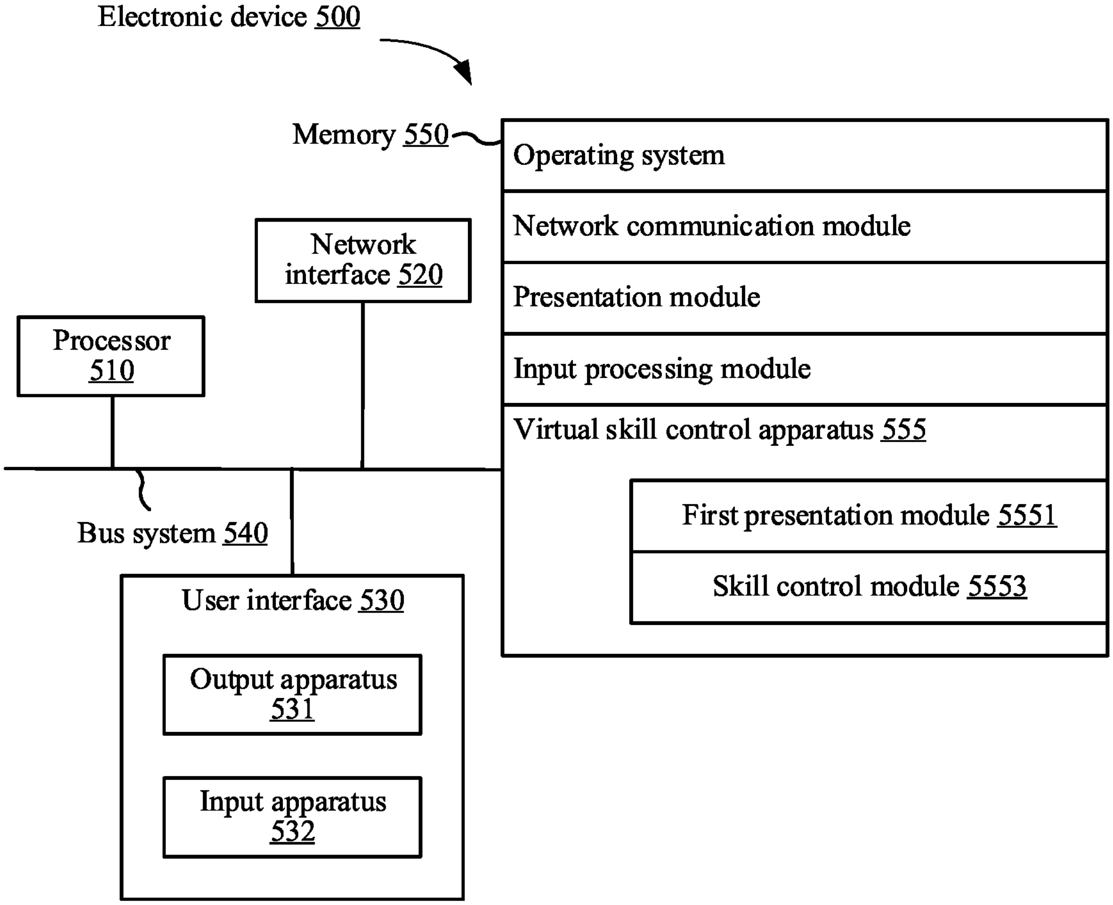
FIG. 2 is a schematic structural diagram of an electronic device 500 according to an embodiment of this application.

Referring to FIG. 2, FIG. 2 is a schematic structural diagram of an electronic device 500 according to an embodiment of this application. In practice, the electronic device 500 may be terminal 400-1, terminal 400-2 or the server in FIG. 1. Taking the electronic device as terminal 400-1 or terminal 400-2 shown in FIG. 1 as an example, the electronic device implementing a virtual skill control method according to an embodiment of this application is described. The electronic device 500 shown in FIG. 2 includes: at least one processor 510, a memory 550, at least one network interface 520, and a user interface 530. Components in the electronic device 500 are coupled together by using a bus system 540. It may be understood that, the bus system 540 is configured to implement connection and communication between the components. In addition to a data bus, the bus system 540 further includes a power bus, a control bus, and a state signal bus. However, for ease of clear description, all types of buses in FIG. 2 are marked as the bus system 540.

The processor 510 may be an integrated circuit chip having signal processing capabilities, for example, a general processor, a digital signal processor (DSP), another programmable logic device, discrete gate or transistor logic device, or discrete hardware component, or the like. The general processor may be a microprocessor, any conventional processor, or the like.

The user interface 530 includes one or more output apparatuses 531 that enable the presentation of media content, including one or more speakers and/or one or more visual display screens. The user interface 530 further includes one or more input apparatuses 532, including user interface components that facilitate user input, such as a keyboard, a mouse, a microphone, a touch-screen display, a camera, or another input button and control.

The memory 550 may be removable, non-removable, or a combination thereof. Exemplary hardware devices include solid state memories, hard disk drives, optical disk drives, and the like. The memory 550, in some embodiments, includes one or more storage devices physically remote from the processor 510.

The memory 550 includes a volatile memory or a non-volatile memory, or may include both a volatile memory and a non-volatile memory. The non-volatile memory may be a read only memory (ROM), and the volatile memory may be a random access memory (RAM). The memory 550 described in this embodiment of this application aims to include any suitable type of memory.

In some embodiments, a virtual skill control apparatus according to an embodiment of this application may be implemented in software. FIG. 2 shows a virtual skill control apparatus 555 stored in a memory 550, which may be software in the form of a program and a plug-in. The apparatus includes the following software modules: a first presentation module 5551 and a skill control module 5553. These modules are logical and thus may be combined randomly or further split depending on the functions implemented. The functions of the individual modules will be described below.

Figure 3:
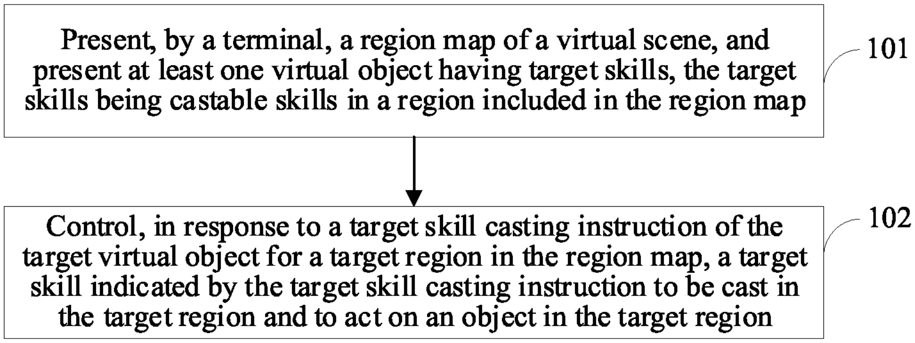
FIG. 3 is a schematic flowchart of a virtual skill control method according to an embodiment of this application.

Based on the above description of the virtual skill control system according to the foregoing embodiment of this application, the following will describe a virtual skill control method according to an embodiment of this application. In actual implementation, the method may be implemented by the terminal or the server 200 shown in FIG. 1 alone, or may be implemented by the terminal and the server 200 shown in FIG. 1 in cooperation. Next, referring to FIG. 1 and FIG. 3, FIG. 3 is a schematic flowchart of a virtual skill control method according to an embodiment of this application. The virtual skill control method according to this embodiment of this application is separately implemented by the terminal shown in FIG. 1.

Step 101: Present, by a terminal, a region map of a virtual scene, and present at least one virtual object having target skills, the target skills being castable skills in a region included in the region map.

In practice, an application supporting the virtual scene is installed on the terminal. When a user opens the application on the terminal and the terminal runs the application, the user may perform a touch operation on the terminal. After detecting the touch operation of the user, the terminal obtains, in response to the touch operation, scene data of the virtual scene, and renders a picture of the virtual scene based on the scene data of the virtual scene. The rendered picture of the virtual scene is presented on the terminal. For example, a region map of the virtual scene is presented on the terminal, and an existing virtual object is presented. The region map may be a region map corresponding to a global region of the virtual scene, or may be a local map corresponding to a partial region of the virtual scene.

The virtual object presented in the region map is an identifier, avatar, model image, or the like of the virtual object, rather than a virtual object entity or object model of the virtual object. When the model image is used for representing an object model of a virtual object viewed from a certain perspective, an appearance form of the virtual object may be an image obtained by photographing the object model of the virtual object, or may be an image generated based on a texture map of the object model of the virtual object. For example, the model image may be a front view of the object model of the virtual object. By displaying the identifier, avatar or model image of the virtual object without displaying the whole object model, it is possible to clearly and intuitively show the specific virtual object to participate in a battle, thereby reducing the display workload and improving the display efficiency.

In some embodiments, the terminal may present at least one virtual object having target skills in the following manners: presenting a virtual object list corresponding to a current login account in an interface of the region map; and presenting a plurality of virtual objects configured by the current login account in the virtual object list, the plurality of virtual objects including at least one virtual object having target skills.

Here, before or during controlling the virtual object to interact in the region map, a user may view the virtual object list corresponding to the current login account in the interface of the region map. In practice, the user may control the plurality of virtual objects to interact in the region map.

In some embodiments, the terminal may configure the virtual object in the following manners: presenting an object configuration function item in the virtual object list; presenting, in response to a trigger operation for the object configuration function item, a category selection interface including at least one candidate category; and configuring, in response to a selection operation for a target category in the at least one candidate category, a virtual object corresponding to the target category as a virtual object of the current login account.

In practice, before the interaction, the user may determine a virtual object to participate in the interaction in an equipment interface of the virtual object, the interaction ability of different types of virtual objects is different, and selecting the virtual object suitable for this interaction task is more conducive to improve the interaction efficiency. For example, when the virtual object is a soldier required for combat, the virtual object may be called a soldier, and the category of the virtual object may be called a virtual troop, namely the category of a virtual solder. The troop may be the category of combat units used in player or non-player character troops. The combat ability of different categories of virtual troops is different, and the player may select a target category of virtual troop to participate in the combat. For another example, when the virtual object is a hero required for combat, the hero is used for representing a combat unit of a player or a non-player character in a virtual scene, the combat ability of different categories of heroes is also different, and the player may select a target category of hero to participate in the combat.

In practice, relevant introduction information of the virtual object corresponding to the selected category may also be presented in a category selection interface, such as the name of the virtual object, the level of the virtual object, the category to which the virtual object belongs, and the virtual skill that can be configured or equipped by the virtual object. When the virtual object is not configured or equipped with the virtual skill, none may be displayed when the virtual skill is displayed. When the virtual object is configured or equipped with the virtual skill, the configured or equipped virtual skill is displayed.

Figure 4:
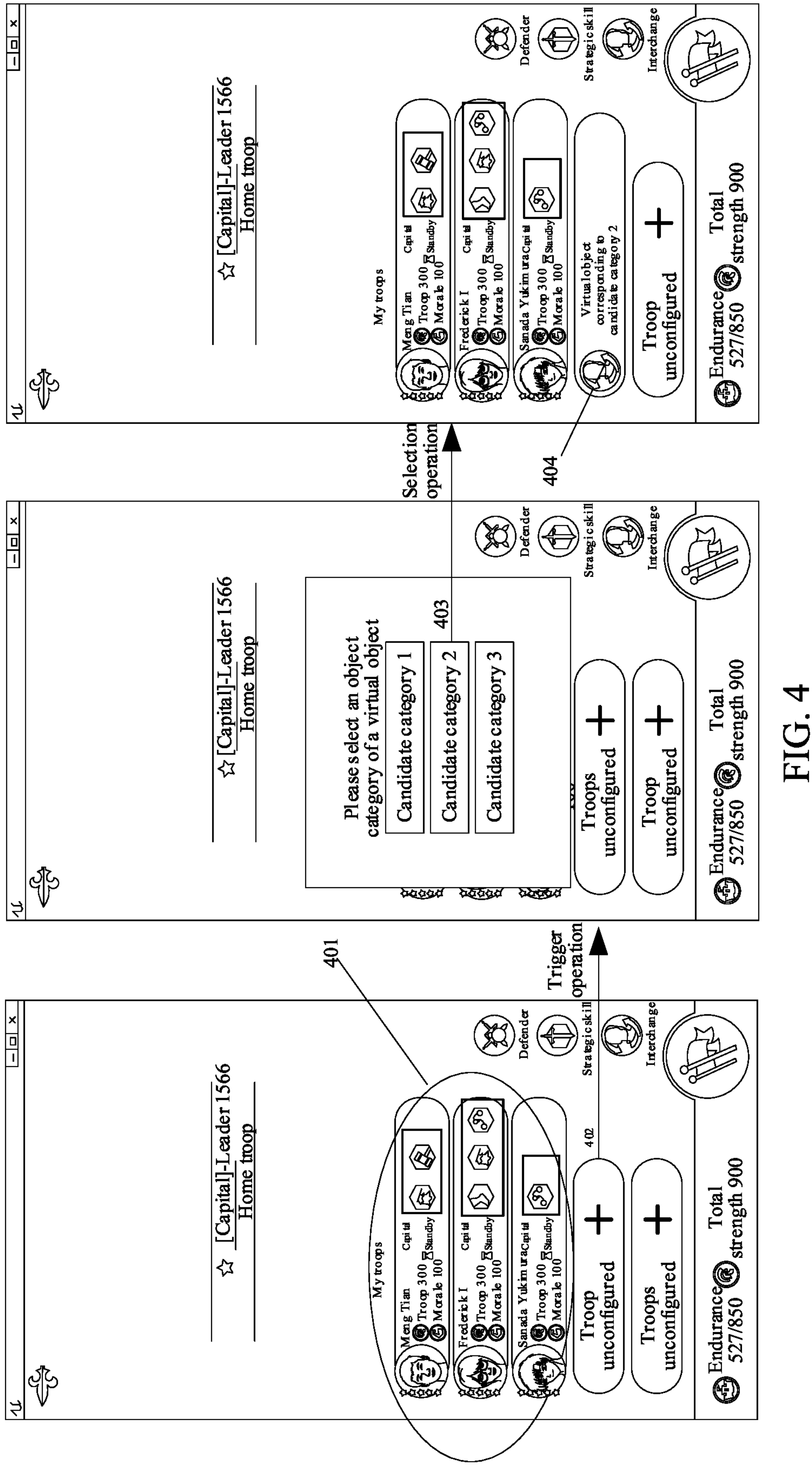
FIG. 4 is a schematic diagram of a configuration interface of a virtual object according to an embodiment of this application.

Referring to FIG. 4, FIG. 4 is a schematic diagram of a configuration interface of a virtual object according to an embodiment of this application. A virtual object list corresponding to a current login account is presented in an interface of a region map. In the virtual object list, a plurality of virtual objects 401 which have been configured in the current login account and an object configuration function item 402 for configuring a new virtual object are presented. When a user triggers (operations such as clicking/tapping, sliding, dragging, and pressing) the object configuration function item 402, the terminal presents, in response to the trigger operation, a category selection interface including at least one candidate category. In response to a selection operation for a target category (candidate category 3) 403 in the at least one candidate category, a virtual object 404 corresponding to the target category is configured as a virtual object of the current login account.

It is to be noted that when selecting a configured virtual object, configuration requirement information may also be presented to prompt a certain category of virtual object in the battle, and a user may select a corresponding category of virtual object for configuration according to the configuration requirement information.

In some embodiments, the terminal may configure the target skill to the virtual object in the following manners: presenting a skill configuration function item of each virtual object in the corresponding virtual object list; determining, in response to a trigger operation for the skill configuration function item, an object category to which a corresponding virtual object belongs, and presenting at least one candidate skill corresponding to the object category; and configuring, in response to a selection operation for a target skill in the at least one candidate skill, the selected target skill to the corresponding virtual object.

Here, before participating in the interaction, the user may determine a virtual object to be involved in the battle in an equipment interface of the virtual object, and configure or equip the virtual object with different virtual skills so as to attach attributes of the virtual skills to the virtual object, thereby improving the interaction ability of the virtual object. Different categories of virtual objects may be configured with different virtual skills to achieve different attribute gain effects. For example, the virtual object is a virtual soldier required for combat. The object categories of the virtual object may include a close combat category, a remote category, a virtual knight category, and the like. The virtual skills used by different categories of virtual objects may be different. The maximum injury values which can be caused by using the corresponding virtual skills may also be different, and the combat distances may also be different.

Figure 5:
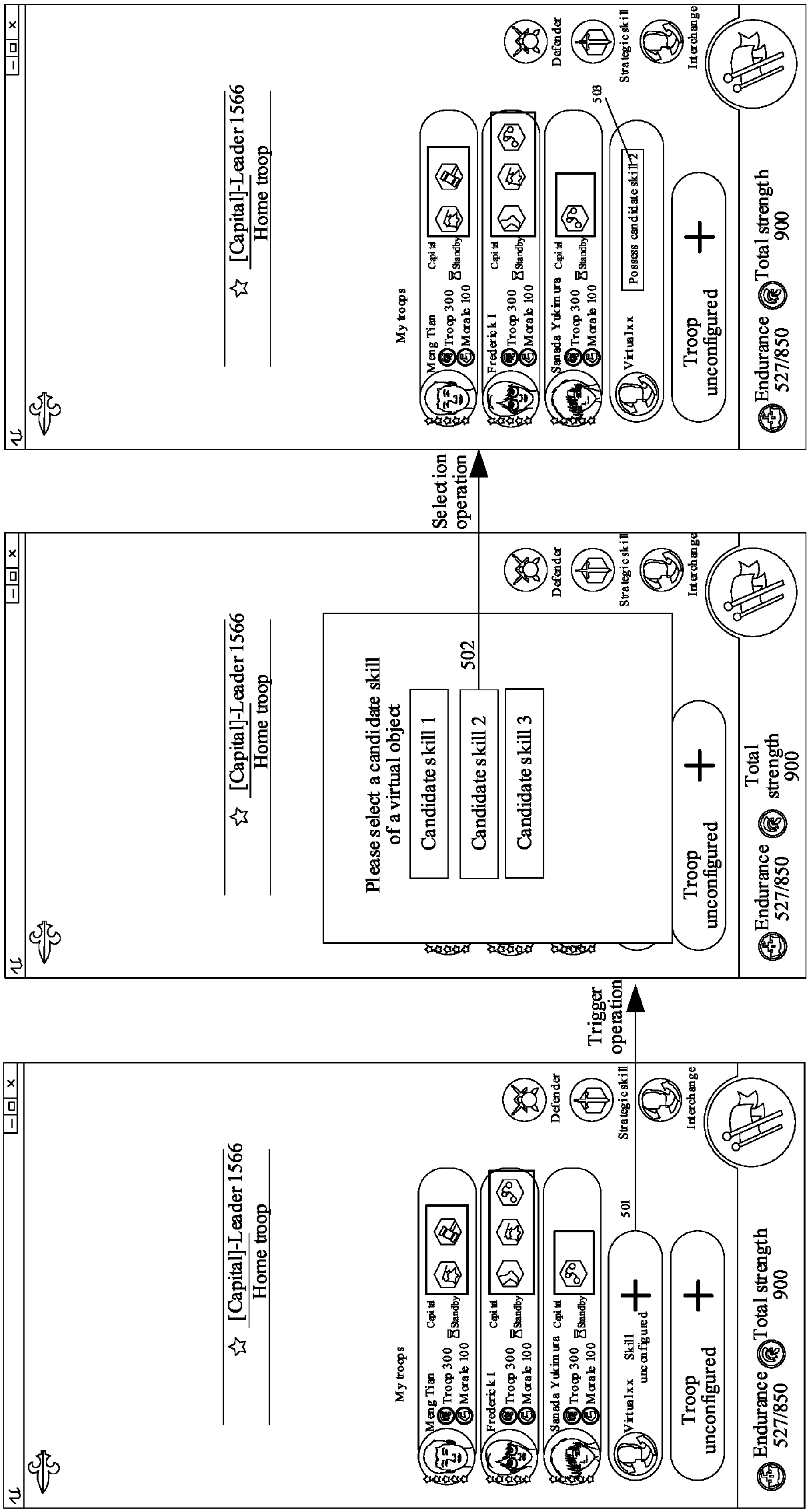
FIG. 5 is a schematic diagram of a configuration interface of a virtual skill according to an embodiment of this application.

Referring to FIG. 5, FIG. 5 is a schematic diagram of a configuration interface of a virtual skill according to an embodiment of this application. A skill configuration function item 501 corresponding to each virtual object in a corresponding virtual object list is presented in an interface of a region map. In response to a trigger operation for the skill configuration function item 501, candidate skill 1, candidate skill 2, and candidate skill 3 corresponding to object categories are presented. When a user selects candidate skill 2 (502), the selected candidate skill 2 is configured as a target skill to the corresponding virtual object. That is, virtual object XX has candidate skill 2.

In the foregoing manner, candidate skills adapted to object types are configured as target skills according to an object category of a virtual object, virtual skills (namely, the candidate skills) are divided, and the attribute of classification is given to the virtual skills. The virtual skills which matches the object category of the virtual object is more suitable for the virtual object, so that the configured virtual skills can be more rationalized and better meet user requirements, and a better gain effect can be brought to the virtual object, without manually comparing whether the attribute of the virtual skills matches the virtual object, thereby improving the equipment efficiency.

In some embodiments, the terminal may configure the target skill to the virtual object in the following manners: presenting a skill configuration function item of each virtual object in the corresponding virtual object list; determining, in response to a trigger operation for the skill configuration function item, a virtual era to which a corresponding virtual object belongs, and presenting at least one candidate skill of the virtual era; and configuring, in response to a selection operation for a target skill in the at least one candidate skill, the selected target skill to the corresponding virtual object.

Here, in practice, object categories of virtual objects in different virtual eras have an evolution relationship. According to whether the object categories of the virtual objects can evolve with the change of virtual eras, the object categories may be divided into two types, such as a first type and a second type. The first type is a common type, and may change with the change of virtual eras throughout different virtual eras. The second type is a specific type of a virtual era. Taking the virtual object as a virtual solder and the object category as a virtual troop as an example, the first type may be a basic virtual troop, and the second type may be a special virtual troop. The basic virtual troop evolves with the change of virtual eras. For example, the basic virtual troop is a rider in virtual era 1, and evolves to a virtual rider in virtual era 2. The special virtual troop corresponds to the virtual era. The special virtual troops are also different in different virtual eras.

In different virtual eras, the object categories of the virtual objects are different, and the virtual skills adapted to different object categories of virtual objects are also different. Accordingly, in different virtual eras, virtual skills configured or equipped for the virtual object shall also be different, a target skill adapted to the object category of the virtual object among candidate skills corresponding to the virtual eras is selected, and the selected target skill is configured or equipped to the virtual object, thereby improving the interaction ability of the virtual object.

In some embodiments, the terminal may present at least one virtual object having target skills in the following manners: presenting at least one virtual object group in the interface of the region map, the virtual object group including at least one virtual object; and presenting, in response to a trigger operation for a target virtual object group in the at least one virtual object group, at least one virtual object having target skills in the target virtual object group.

In some embodiments, the terminal may construct the virtual object group in the following manners: presenting a construction function item for constructing the virtual object group in the interface of the region map; presenting, in response to a trigger operation for the construction function item, a plurality of alternative candidate virtual objects having different virtual skills; controlling, in response to a selection operation for a target number of virtual objects in the plurality of candidate virtual objects, the selected target number of virtual objects to be in a selected state; and constructing, in response to a one-key configuration operation for the target number of virtual objects in the selected state, a virtual object group including the target number of virtual objects.

Here, in practice, a user corresponding to a current login account may form a plurality of virtual objects into a virtual object group, and the virtual object group is also referred to as a battling team. The so-called battling refers to battling in a virtual battlefield or participating in a certain activity in person. Here, the battling refers to interacting in a virtual scene, such as participating in a virtual battle or completing a certain virtual task. The user may control a plurality of virtual object groups to interact in the virtual scene.

Different virtual object groups may be equipped with different virtual objects, and virtual skills configured or equipped by the virtual objects participating in the interaction may be in various combinations. For example, one virtual object may have multiple virtual skills, which may be partially the same. For example, virtual object A has virtual skills a and b, and virtual object B has virtual skills a and c. By means of various combinations, the virtual object group can gain various attributes, so as to use more flexible tactics in the interaction, thereby improving the operability and interest in the interaction process, effectively improving the viscosity of users, enabling high-end players to reflect various operations in the battle interaction, and enriching the battle content.

In some embodiments, when the virtual object group includes at least two virtual objects and different virtual objects have different object attributes, an exchange function item for exchanging the object attributes is presented. In response to a trigger operation for the exchange function item, each virtual object in the virtual object group is controlled to be in a candidate state. In response to a selection operation for a first virtual object and a second virtual object in the candidate state, the first virtual object and the second virtual object are controlled to exchange the object attributes.

Here, the object attributes refer to attributes, such as jobs, equipments or skills, possessed by the virtual objects. Different virtual objects may have different object attributes. The exchange of the object attributes between different virtual objects may be realized by the exchange function item. For example, when constructing a virtual object group, a corresponding job may be allocated to each virtual object. Different virtual objects may have different jobs. The roles played by virtual objects having different jobs when interacting in the virtual scene are different. In the process of interacting in the virtual scene, the jobs of the virtual objects in the virtual object group may be exchanged in combination with actual situations, so as to improve the overall interaction ability of the virtual object group.

Step 102: Control, in response to a target skill casting instruction of the target virtual object for a target region in the region map, a target skill indicated by the target skill casting instruction to be cast in the target region and to act on an object in the target region.

Here, the triggering of the target skill casting instruction will be described. In practice, after a terminal presents at least one virtual object having target skills, the target skill casting instruction may be triggered in the following manners:

presenting, in view of a trigger operation for the target virtual object in the at least one virtual object, a skill control corresponding to at least one target skill possessed by the target virtual object, the skill controls having a one-to-one correspondence with the target skills; and receiving the target skill casting instruction based on a target skill control in the presented skill controls.

Here, the target virtual object is provided with target skills castable in the region map. When at least one virtual object exists in the virtual object group and a user clicks/taps the virtual object group, a skill control corresponding to at least one target skill possessed by the target virtual object in the virtual object group may be presented. The skill control may be an icon corresponding to the target skill.

In some embodiments, the process of receiving, by the terminal, the target skill casting instruction based on the presented target skill control may include:

displaying, by the terminal in response to a trigger operation for the target skill control, at least one alternative region (for example, at least two alternative regions) in the region map; and receiving, in response to a trigger operation for a target region in the at least one region, the target skill casting instruction. Thus, when the user triggers the target skill control, it is possible to select a region in the region map where it is desired to cast the target skill, thereby enabling precise skill casting.

In some embodiments, the terminal controls, in response to the target skill casting instruction, the target skill corresponding to the target skill control to be cast in the target region, and displays a skill casting picture on the region map, while controlling the cast skill to act on all objects in the target region and displaying a picture in which the cast skill acts on all the objects.

In some embodiments, after presenting a skill control corresponding to at least one target skill possessed by the target virtual object, the terminal may also present, in response to a trigger operation for the target skill control, a detail page of the target skill of the target skill control. A skill description corresponding to the target skill is presented in the detail page. The skill description is used for describing at least one of the following information of the target skill skill cooling time, skill casting notes, or skill consumption.

In some embodiments, the terminal may receive the target skill casting instruction in the following manners: presenting a use function item of a target skill corresponding to the target skill control in the detail page; presenting, in response to a trigger operation for the use function item, prompt information for prompting a selected skill casting position; and receiving, in response to a selection operation for a target region in the region map, the target skill casting instruction based on the prompt information.

For example, when a virtual object is stored in a virtual object group and a user clicks/taps a virtual object group 901, the terminal presents, in response to the clicking/tapping operation, a target virtual object 902 having target skills in the virtual object group 901, and presents three target skills, such as target skill 1, target skill 2, and target skill 3, possessed by the target virtual object 902. When the user selects to click/tap a skill control corresponding to target skill 2, the terminal presents a detail page 903 corresponding to target skill 2, and presents a skill description and a use function item 904 for target skill 2 on the detail page 903. When the user clicks/taps the use function item 904, the terminal presents prompt information 905 in response to the clicking/tapping operation. When the user selects a target region 906 in a region map based on the prompt information 905, the terminal receives a target skill casting instruction of target skill 2 for the target region 906.

In some embodiments, before controlling the target skill corresponding to the target skill control to be cast in the target region, the terminal may receive the target skill casting instruction in the following manners: determining, in response to a trigger operation for the target skill control, a skill type of a target skill corresponding to the target skill control, and displaying at least one region adapted to the skill type in a target display style in the region map, the target display style being used for distinguishing between other regions that are displayed in the region map and not adapted to the skill type; and receiving, in response to a selection operation for a target region in the at least one region, the target skill casting instruction.

Here, when the user selects a target region to be acted on, the target skill casting instruction for the target region may be triggered. In practice, since the region map is composed of a plurality of various regions, attributes corresponding to different regions may be different. For example, region A is a land, region B is a sea, region C is a desert, or a target in region D is a tree, a target in region E is a river, a target in region F is a virtual soldier, and the like. When the virtual object configured with target skills is controlled to perform an interaction operation in a region, the effects of the target skills of different skill types on the region in the map are also different. Therefore, when an effect region is selected in the region map, at least one region adapted to the skill type of the target skill corresponding to the target skill control selected by the user may be highlighted, and other regions not adapted to the skill type of the target skill corresponding to the target skill control selected by the user may be grayed.

For example, assuming that the skill type of the target skill corresponding to the target skill control is a tree cutting type, the target skill may act on a tree. Therefore, region D is highlighted in the region map, and regions A, B, C, E, and F where the target skill cannot act are grayed. Thus, the region meeting the target skill casting condition is displayed in a conspicuous manner, thereby being advantageous to improve the selection speed of the user for selecting the target region, and improving the interaction efficiency.

In some embodiments, before controlling the target skill corresponding to the target skill control to be cast in the target region, the terminal may receive the target skill casting instruction in the following manners: presenting an object model of the target virtual object in the region map; displaying, in response to a trigger operation for the target skill control, at least one alternative region in the region map; controlling, in response to a selection operation for a target region in the at least one region, the object model of the target virtual object to move towards the target region; presenting, when the object model of the target virtual object moves to the target region, prompt information for inquiring whether to cast skills; and receiving, in response to a determining operation for the prompt information, the target skill casting instruction.

In practice, each virtual object may be represented in the region map by the corresponding object model. The object model may embody the appearance form of the virtual object and can embody the movement of the virtual object by controlling the movement of the object model. The object model may be a two dimension model, a three dimension model, or a 2.5-dimension model. This is not limited in the embodiments of this application. When displaying a virtual object in the region map, the terminal may invoke an object model corresponding to the virtual object and display the object model. The user may learn which virtual object participates in the interaction by viewing the displayed object model, and the display mode is intuitive and vivid. The user can preview the appearance of the virtual object when it is displayed in the region map.

Here, after the target region is selected, the object model of the target virtual object is controlled to move to the target region, the prompt information is presented to inquire whether to cast a skill, and when it is determined that the skill is cast, the corresponding target skill casting instruction may be triggered. Otherwise, the target skill casting instruction is not triggered. Certainly, in practice, the prompt information may not be presented when the object model of the target virtual object moves to the target region, but the target skill casting instruction may be directly triggered when the object model moves to the target region.

In some embodiments, the terminal may control the target skill corresponding to the target skill control to be cast in the target region in the following manners: presenting an object model of the target virtual object in the region map; and controlling the object model of the target virtual object to move to the target region, and controlling the object model of the target virtual object to cast a target skill corresponding to the target skill control in the target region.

Here, when a target region to be acted on is selected, the object model of the virtual object may be controlled to move to the target region. When the object model moves to the target region, the object model of the virtual object may be controlled to cast the target skill to be cast in the target region and to act on all objects in the target region, and the whole process picture may be displayed in the region map.

An exemplary application of the embodiments of this application in an actual application scene will be described below. Taking a virtual scene as a strategic game and a region map as a world map corresponding to a global region of the virtual scene as an example, the virtual skill control method according to this embodiment of this application is further described. The strategic game is a game that is composed of resource acquisition, base construction, science and technology development, and operation unit combats and focuses on strategy. Players may play the role of virtual leadership in the game, such as virtual generals, and carry out the macro operations of dispatching generals. A player may control a plurality of virtual teams (namely, the foregoing virtual object groups) to perform game activities, such as virtual expedition, virtual camping, and virtual battling. Heroes or virtual troops (the category of combat units used by the player, namely, the foregoing virtual objects) in the teams are provided with virtual troop skills (namely, the foregoing virtual skills) The player may control the virtual troops having the virtual troop skills to battle in the game.

However, the virtual troop skills in the related art can only take effect in a virtual combat and cannot be cast in a world map. Therefore, these virtual troop skills only have an impact on both sides in the closed combat, so that the world map remains static in the process of battling between both sides, the process of battling cannot be viewed through the world map, and the display content of the world map is single. And when the categories of the virtual troops in the team are switched, the virtual troops are only changed according to professional categories or the whole team is switched, so that the categories are few and fixed. There is no direct relationship between individual troops and troop skills, and it is difficult to reflect the unique differences of each virtual troop.

To this end, an embodiment of this application provides a virtual skill control method. A target skill castable in a world map is provided. The target skill castable in the world map is configured for virtual troops in a virtual team. Players control such virtual troops to use the target skill to interact with a target object in a target region of the world map, so that an interaction process can be displayed in the world map. Compared with only presenting an interaction result in the world map instantaneously, the display content of the world map is greatly enriched, and the interest of interaction based on the world map is improved.

Figure 6:
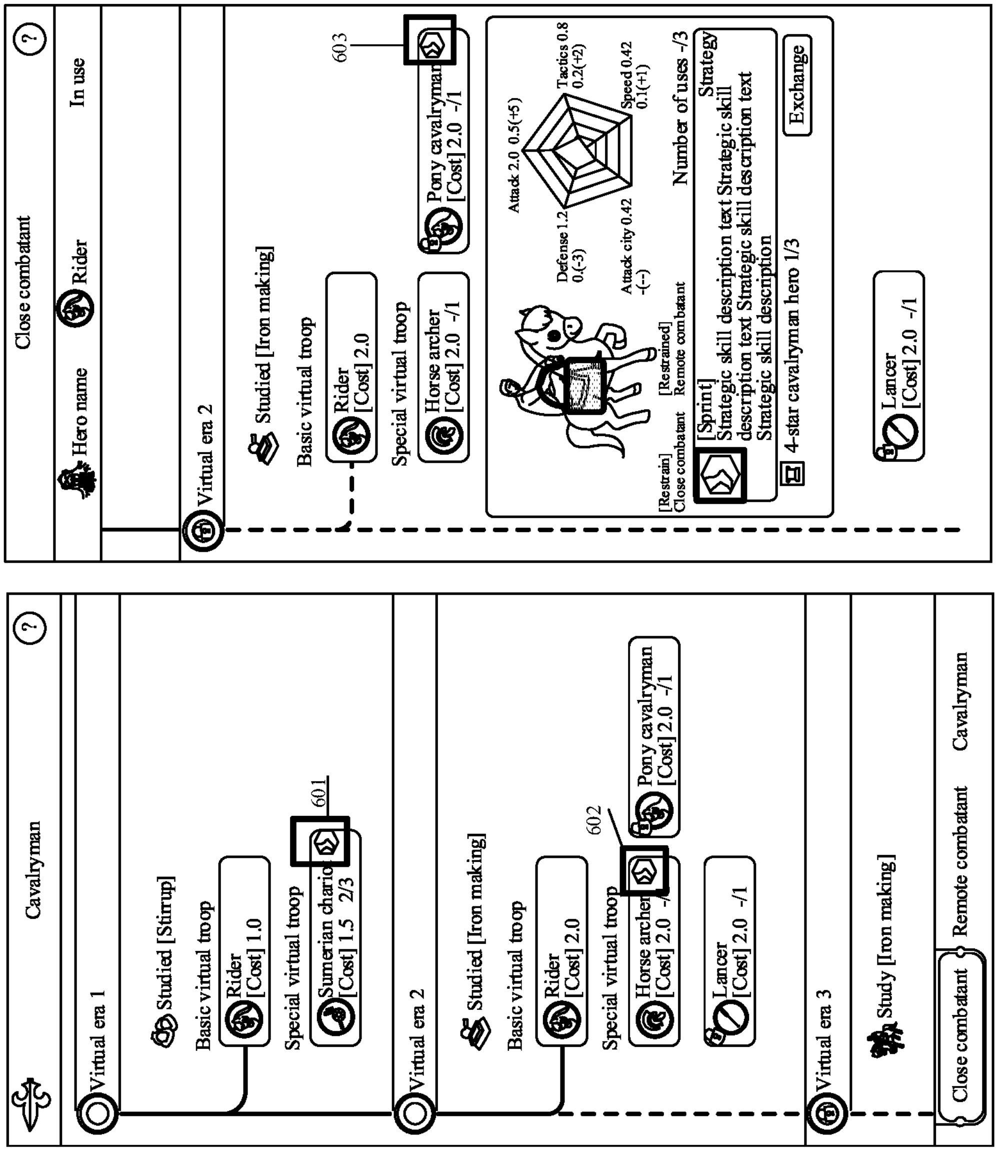
FIG. 6 is a schematic diagram of a virtual troop according to an embodiment of this application.

Referring to FIG. 6, FIG. 6 is a schematic diagram of a virtual troop according to an embodiment of this application. A virtual troop library is opened, a complete virtual troop list in a game may be checked, and an icon of a target skill is displayed in the upper right corner of a column of the virtual troops. The target skills as indicated by icons 601 and 602 in FIG. (a) are skills, castable in a world map, configured by the corresponding virtual troops. The target skill indicated by icon 603 in FIG. (b) is also a skill, castable in the world map, configured by the corresponding virtual troop. When a user clicks/taps the corresponding virtual troop, a terminal may display details of the virtual troop for the user to view detailed descriptions of the virtual troop and the target skill.

Figure 7:
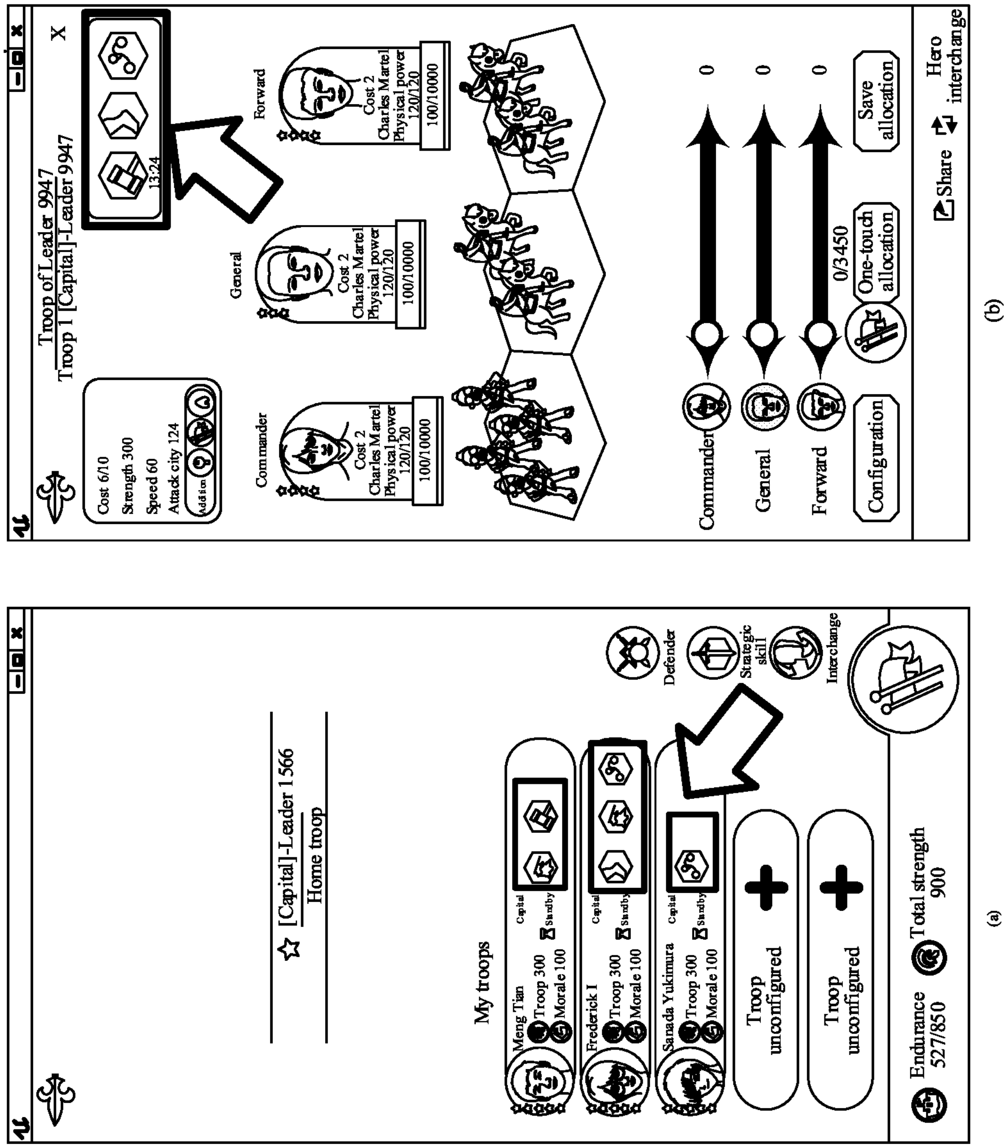
FIG. 7 is a schematic diagram of display of a target skill according to an embodiment of this application.

Referring to FIG. 7, FIG. 7 is a schematic diagram of display of a target skill according to an embodiment of this application. In FIG. (a), team members and target skills that are possessed by the members and castable in a world map may be viewed in a team list. In FIG. (b), team members may be viewed in a team creation interface. When a member is clicked/tapped, target skills that are possessed by the corresponding member and castable in the world map may be displayed.

Figure 8:
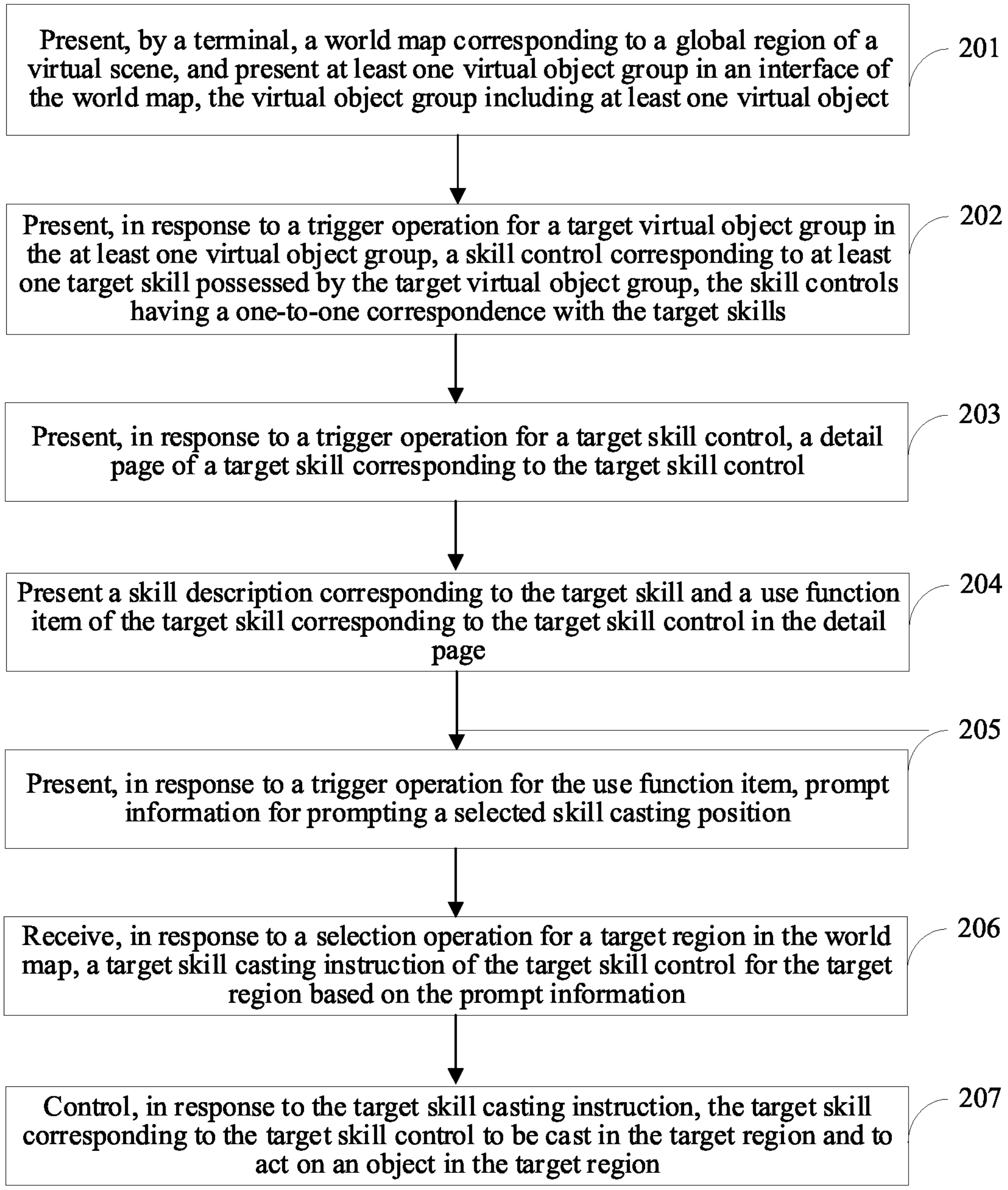
FIG. 8 is a schematic flowchart of a virtual skill control method according to an embodiment of this application.

Next, referring to FIG. 8, the virtual skill control method according to this embodiment of this application will be described. FIG. 8 is a schematic flowchart of a virtual skill control method according to an embodiment of this application. The method includes the following steps:

Step 201: Present, by a terminal, a world map corresponding to a global region of a virtual scene, and present at least one virtual object group in an interface of the world map, the virtual object group including at least one virtual object.

The virtual object group is a team. The virtual object group includes at least one virtual object. That is, the team includes at least one member. A player may control a plurality of virtual object groups to engage in a game activity.

Step 202: Present, in response to a trigger operation for a target virtual object group in the at least one virtual object group, a skill control corresponding to at least one target skill possessed by the target virtual object group, the skill controls having a one-to-one correspondence with the target skills.

Here, in practice, not all the virtual object groups have the ability to cast skills in the world map, only the virtual object group where virtual objects equipped with the target skills are located has the target skills, and the virtual object group having the target skills can directly use the target skills in the world map.

In actual implementation, each virtual object may be associated with the target skill. For example, the target skill may be associated with the corresponding virtual object through an association configuration between virtual object identifiers and target skill identifiers.

When a user clicks/taps the presented target virtual object group, if the target virtual object group has at least one target skill, a skill control corresponding to the target skill is displayed. The skill control is an icon of the corresponding target skill.

Step 203: Present, in response to a trigger operation for a target skill control, a detail page of a target skill corresponding to the target skill control.

Step 204: Present a skill description corresponding to the target skill and a use function item of the target skill corresponding to the target skill control in the detail page.

The skill description is used for describing at least one of the following information of the target skill skill cooling time, skill casting notes, or skill consumption.

Step 205: Present, in response to a trigger operation for the use function item, prompt information for prompting a selected skill casting position.

Step 206: Receive, in response to a selection operation for a target region in the world map, a target skill casting instruction of the target skill control for the target region based on the prompt information.

Here, in practice, the terminal may also determine, in response to a trigger operation for the target skill control, a skill type of the target skill corresponding to the target skill control, and display at least one region adapted to the skill type in a target display style in the world map. In response to a selection operation for the target region in the at least one region, the target skill casting instruction is received. The target display style is used for distinguishing between other regions that are displayed in the world map and not adapted to the skill type, such as highlighting a region on which the selected target skill can act.

Step 207: Control, in response to the target skill casting instruction, the target skill corresponding to the target skill control to be cast in the target region and to act on an object in the target region.

Figure 9:
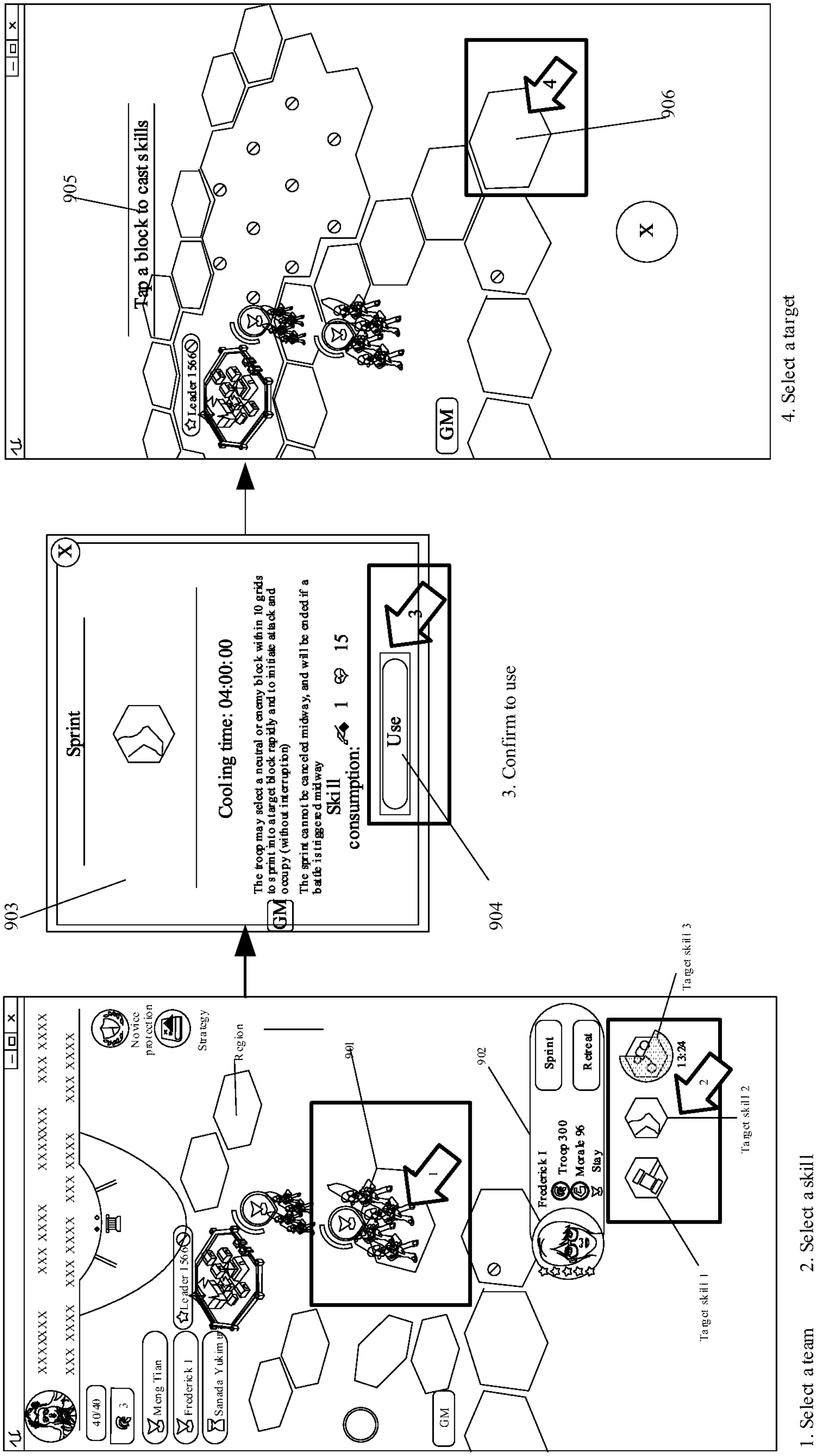
FIG. 9 is a schematic diagram of an implementation interface of a virtual skill control method according to an embodiment of this application.

Based on the method shown in FIG. 8, next referring to FIG. 9, FIG. 9 is a schematic diagram of an implementation interface of a virtual skill control method according to an embodiment of this application. As shown in FIG. 9, when a virtual object is stored in a virtual object group and a user clicks/taps a virtual object group 901, the terminal presents, in response to the clicking/tapping operation, a target virtual object 902 having target skills in the virtual object group 901, and presents three target skills, such as target skill 1, target skill 2, and target skill 3, possessed by the target virtual object 902. When the user selects to click/tap a skill control corresponding to target skill 2, the terminal presents a detail page 903 corresponding to target skill 2, and presents a skill description and a use function item 904 for target skill 2 on the detail page 903. When the user clicks/taps the use function item 904, the terminal presents prompt information 905 in response to the clicking/tapping operation. When the user selects a target region 906 in a world map based on the prompt information 905, the terminal receives a target skill casting instruction of target skill 2 for the target region 906, and controls, in response to the target skill casting instruction, target skill 2 to be cast in the target region 906. If it is assumed that target skill 2 is a stone thrower, the virtual object group 901 is controlled to throw stones to a target in the target region of the world map by using the stone thrower, and the whole process is displayed in the world map.

When implementing the foregoing mode provided by this embodiment of this application, the server may configure the target skill, including but not limited to a skill name, a target, a special item, duration, coordinates, a visual effect, a visible range, various numerical values, and other information. The terminal may display the available target skills in each team display interface based on system rules according to the troop library of the player, the setting of each target skill, the configuration of the player team, and the like, obtained by the server. The player may select a team and use the corresponding target skill in the world map (namely, in the world environment) based on a casting flow. When the player uses the target skill in the world map, corresponding operation data is synchronized to other players in the world map via a map server, so that the other players can also synchronously observe the effect and visual effect of the target skill.

In this way, this embodiment of this application provides a large number of target skills available on the world map, and these target skills match the setting of various virtual objects, thereby greatly strengthening the sense of existence and difference of virtual troop units in the world environment. The team including these virtual objects may directly use these target skills on the world map, and display the corresponding effects on the world map level synchronously, thereby greatly strengthening the strategy of playing on the world map level. The problems that the difference of similar strategic game troop systems is small, virtual skills only take effect in the internal battlefield but have no obvious effect in the world environment, and strategic playing methods in the world environment level are insufficient are solved, and the blank of similar game troop systems is filled.

Figure 10:
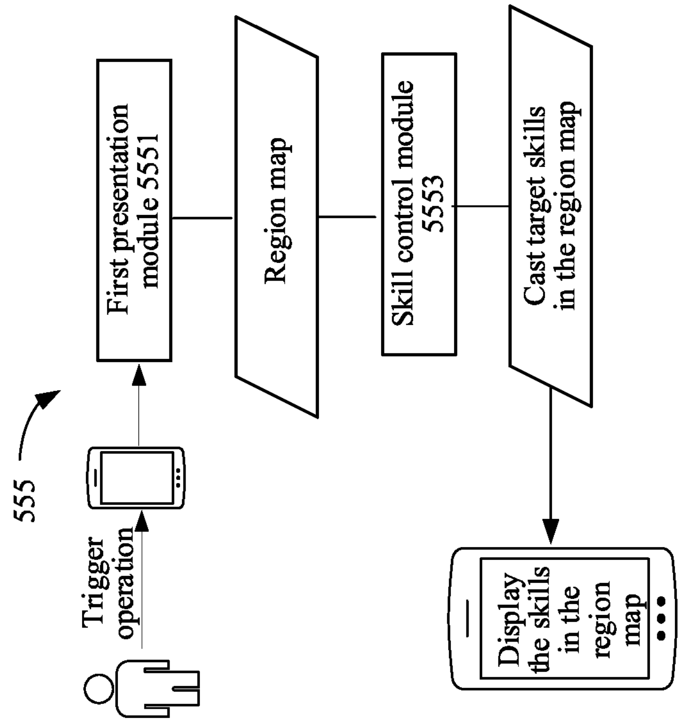
FIG. 10 is a schematic structural diagram of a virtual skill control apparatus according to an embodiment of this application.

An exemplary structure of the virtual skill control apparatus 555 implemented as a software module according to an embodiment of this application is further described below. In some embodiments, referring to FIG. 10, FIG. 10 is a schematic structural diagram of a virtual skill control apparatus according to an embodiment of this application. The software modules stored in the virtual skill control apparatus 555 of the memory 550 in FIG. 2 may include:

a first presentation module 5551, configured to present a region map of a virtual scene, and present at least one virtual object having target skills, the at least one virtual object including a target virtual object, and the target skills being castable skills in the region map; and a skill control module 5553, configured to control, in response to a target skill casting instruction of the target virtual object for a target region in the region map, a target skill indicated by the target skill casting instruction to be cast in the target region and to act on an object in the target region.

In some embodiments, the first presentation module is further configured to: present a virtual object list of a current login account; and present a plurality of virtual objects configured by the current login account in the virtual object list, the plurality of virtual objects including at least one virtual object having target skills.

In some embodiments, the apparatus further includes:

an object configuration module, configured to: present an object configuration function item in the virtual object list;

present, in response to a trigger operation for the object configuration function item, a category selection interface including at least one candidate category; and configure, in response to a selection operation for a target category in the at least one candidate category, a virtual object of the target category as a virtual object of the current login account.

In some embodiments, the apparatus further includes:

a skill configuration module, configured to: present a skill configuration function item of each virtual object in the virtual object list;

determine, in response to a trigger operation for the skill configuration function item, an object category to which a corresponding virtual object belongs, and present at least one candidate skill corresponding to the object category; and configure, in response to a selection operation for a target skill in the at least one candidate skill, the selected target skill to the corresponding virtual object.

In some embodiments, the skill configuration module is further configured to: present a skill configuration function item of each virtual object in the virtual object list;

determine, in response to a trigger operation for the skill configuration function item, a virtual era to which a corresponding virtual object belongs, and present at least one candidate skill of the virtual era; and configure, in response to a selection operation for a target skill in the at least one candidate skill, the selected target skill to the corresponding virtual object.

In some embodiments, the first presentation module is further configured to: present at least one virtual object group, the virtual object group including at least one virtual object; and present, in response to a trigger operation for a target virtual object group in the at least one virtual object group, at least one virtual object having target skills in the target virtual object group.

In some embodiments, the apparatus further includes:

an object group construction module, configured to: present a construction function item for constructing the virtual object group;

present, in response to a trigger operation for the construction function item, a plurality of alternative candidate virtual objects having different virtual skills;

control, in response to a selection operation for a target number of virtual objects in the plurality of candidate virtual objects, the selected target number of virtual objects to be in a selected state; and construct, in response to a one-key configuration operation for the target number of virtual objects in the selected state, a virtual object group including the target number of virtual objects.

In some embodiments, the apparatus further includes:

a job exchange module, configured to: present, when the virtual object group includes at least two virtual objects and different virtual objects have different object attributes, an exchange function item for exchanging the object attributes;

control, in response to a trigger operation for the exchange function item, each virtual object in the virtual object group to be in a candidate state; and control, in response to a selection operation for a first virtual object and a second virtual object in the candidate state, the first virtual object and the second virtual object to exchange the object attributes.

In some embodiments, the apparatus further includes a second presentation module 5552.

The presentation module is configured to present, in response to a trigger operation for the target virtual object, a skill control of at least one target skill possessed by the target virtual object, the skill controls having a one-to-one correspondence with the target skills.

The skill control module 5553 is further configured to receive the target skill casting instruction based on a target skill control in the presented skill controls.

In some embodiments, the skill control module 5553 is further configured to: display, in response to a trigger operation for the target skill control, at least one alternative region in the region map; and receive, in response to a trigger operation for a target region in the at least one region, the target skill casting instruction.

In some embodiments, the apparatus further includes:

a third presentation module, configured to: present, in response to a trigger operation for the target skill control, a detail page of a target skill corresponding to the target skill control; and present a skill description of the target skill in the detail page, the skill description being configured to describe at least one of the following information of the target skill skill cooling time, skill casting notes, or skill consumption.

In some embodiments, the skill control module 5553 is further configured to: present a use function item of a target skill corresponding to the target skill control in the detail page;

present, in response to a trigger operation for the use function item, prompt information for prompting a selected skill casting position; and receive, in response to a selection operation for a target region in the region map, the target skill casting instruction based on the prompt information.

In some embodiments, the skill control module 5553 is further configured to: determine, in response to a trigger operation for the target skill control, a skill type of a target skill corresponding to the target skill control, and display at least one region adapted to the skill type in a target display style in the region map, the target display style being used for distinguishing between other regions that are displayed in the region map and not adapted to the skill type; and receive, in response to a selection operation for a target region in the at least one region, the target skill casting instruction.

In some embodiments, the skill control module 5553 is further configured to: present an object model of the target virtual object in the region map;

display, in response to a trigger operation for the target skill control, at least one alternative region in the region map;

control, in response to a selection operation for a target region in the at least one region, the object model of the target virtual object to move towards the target region;

present, when the object model of the target virtual object moves to the target region, prompt information for inquiring whether to cast skills; and receive, in response to a determining operation for the prompt information, the target skill casting instruction.

In some embodiments, the skill control module is further configured to: present an object model of the target virtual object in the region map; and control the object model of the target virtual object to move to the target region, and control the object model of the target virtual object to cast a target skill corresponding to the target skill control in the target region.

An embodiment of this application provides a computer program product or computer program. The computer program product or computer program includes computer instructions. The computer instructions are stored in a non-transitory computer-readable storage medium. A processor of a computer device reads the computer instructions from the computer-readable storage medium. The processor executes the computer instructions, so as to enable the computer device to perform the virtual skill control method according to the foregoing embodiment of this application.

An embodiment of this application provides a computer-readable storage medium storing executable instructions. The executable instructions are stored therein. When executed by a processor, the executable instructions may trigger the processor to perform the virtual skill control method according to the foregoing embodiment of this application.

An embodiment of this application also provides a computer program product, including computer programs or instructions. The computer programs or instructions, when executed by a processor, implement the virtual skill control method according to the foregoing embodiment of this application.

In some embodiments, the computer-readable storage medium may be a read-only memory (ROM), a random access memory (RAM), an erasable programmable read-only memory (EPROM), an electrically erasable programmable read-only memory (EEPROM), a flash memory, a magnetic surface memory, an optical disk, a CD-ROM, or another memory. Various devices including one or any combination of the foregoing memories are also possible.

In some embodiments, the executable instructions may take the form of program, software, software module, script, or code, may be written in any form of programming language (including compiled or interpreted languages, or declarative or procedural languages), and may be deployed in any form, including as a stand-alone program or as a module, component, subroutine, or another unit suitable for use in a computing environment.

By way of example, the executable instructions may, but need not, correspond to files in a file system, and may be stored in a portion of a file that stores other programs or data, for example, in one or more scripts in a hyper text markup language (HTML) document, in a single file dedicated to the program in question, or in a plurality of coordinated files (for example, files that store one or more modules, subroutines, or portions of code).

By way of example, the executable instructions may be deployed to be executed on one computing device, or on a plurality of computing devices located at one site, or on a plurality of computing devices distributed across multiple sites and interconnected by a communication network.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are merely embodiments of this application and are not intended to limit the protection scope of this application. Any modification, equivalent replacement, or improvement made without departing from the spirit and principle of this application shall fall within the protection scope of this application.

What is claimed is:

1. A virtual skill control method, performed by an electronic device, the method comprising:

displaying an electronic game interface when logging into an electronic game;

displaying a region map of a virtual scene, wherein the region map comprises a target region;

displaying a virtual object list of a current login account;

displaying a plurality of virtual objects configured by the current login account in the virtual object list, the plurality of virtual objects comprising at least one virtual object having target skills in the region map, the at least one virtual object comprising a target virtual object, in response to a clicking/tapping operation on a virtual object group, presenting a target virtual object having target skills in the virtual object group, and presenting at least one target skill possessed by the target virtual object, wherein the target skills are castable in a world map and are configured for virtual troops in a virtual team;

when a user selects to click/tap a skill control corresponding to a target skill, presenting a detail page corresponding to the target skill, and presenting a skill description and a use function item for the target skill on the detail page;

when the user clicks/taps the use function item, presenting prompt information in response to the clicking/tapping operation;

when the user selects the target region in the world map based on the prompt information, receiving a target skill casting instruction for the target region, and controlling, in response to the target skill casting instruction, the target skill to be cast in the target region;

in response to a target skill casting instruction of the target virtual object for the target region in the region map, controlling a target skill indicated by the target skill casting instruction to be cast in the target region and to act on at least one virtual object in the target region, wherein the virtual troops use the target skill to interact with a target object in the target region of the world map, so that an interaction process is displayed in the world map;

wherein an effect of the target skill is synchronously displayed in the target region and the region map in real time, wherein, when a virtual object group comprises at least two virtual objects and different virtual objects have different object attributes, the method further comprises:

displaying an exchange function item for exchanging the object attributes;

in response to a trigger operation for the exchange function item, controlling each virtual object in the virtual object group to be in a candidate state; and in response to a selection operation for a first virtual object and a second virtual object in the candidate state, controlling the first virtual object and the second virtual object to exchange the object attributes.

2. The method according to claim 1, wherein the method further comprises:

displaying an object configuration function item in the virtual object list;

in response to a trigger operation for the object configuration function item, displaying a category selection interface comprising at least one candidate category; and in response to a selection operation for a target category in the at least one candidate category, configuring a virtual object of the target category as a virtual object of the current login account.

3. The method according to claim 1, wherein the method further comprises:

displaying a skill configuration function item of each virtual object in the virtual object list;

in response to a trigger operation for the skill configuration function item, displaying an object category to which a corresponding virtual object belongs and at least one candidate skill corresponding to the object category; and in response to a selection operation for a target skill in the at least one candidate skill, configuring the selected target skill to the corresponding virtual object.

4. The method according to claim 1, wherein the method further comprises:

displaying a skill configuration function item of each virtual object in the virtual object list;

in response to a trigger operation for the skill configuration function item, displaying a virtual era to which a corresponding virtual object belongs and at least one candidate skill of the virtual era; and in response to a selection operation for a target skill in the at least one candidate skill, configuring the selected target skill to the corresponding virtual object.

5. The method according to claim 1, wherein the displaying at least one virtual object having target skills in the region map comprises:

displaying at least one virtual object group, the virtual object group comprising at least one virtual object; and in response to a trigger operation for a target virtual object group in the at least one virtual object group, displaying at least one virtual object having target skills in the target virtual object group.

6. The method according to claim 5, wherein the method further comprises:

displaying a construction function item for constructing the virtual object group;

in response to a trigger operation for the construction function item, displaying a plurality of alternative candidate virtual objects having different virtual skills;

in response to a selection operation for a target number of virtual objects in the plurality of candidate virtual objects, controlling the selected target number of virtual objects to be in a selected state; and in response to a one-key configuration operation for the target number of virtual objects in the selected state, constructing a virtual object group comprising the target number of virtual objects.

7. The method according to claim 1, wherein the method further comprises:

in response to a trigger operation for the target virtual object, displaying a skill control of at least one target skill possessed by the target virtual object, the skill controls having a one-to-one correspondence with the target skills; and receiving the target skill casting instruction based on a target skill control in the presented skill controls.

8. The method according to claim 7, wherein the receiving the target skill casting instruction based on a target skill control in the presented skill controls comprises:

displaying, in response to a trigger operation for the target skill control, at least one alternative region in the region map; and receiving, in response to a trigger operation for a target region in the at least one region, the target skill casting instruction.

9. The method according to claim 7, wherein the method further comprises:

in response to a trigger operation for the target skill control, displaying a detail page of a target skill of the target skill control; and displaying a skill description of the target skill in the detail page, the skill description describing at least one of the following information of the target skill: skill cooling time, skill casting notes, or skill consumption.

10. The method according to claim 9, wherein the receiving the target skill casting instruction comprises:

displaying a use function item of a target skill corresponding to the target skill control in the detail page;

in response to a trigger operation for the use function item, displaying prompt information for prompting a selected skill casting position; and in response to a selection operation for a target region in the region map, receiving the target skill casting instruction based on the prompt information.

11. The method according to claim 7, wherein the receiving the target skill casting instruction based on a target skill control in the presented skill controls comprises:

determining, in response to a trigger operation for the target skill control, a skill type of a target skill corresponding to the target skill control, and displaying at least one region adapted to the skill type in a target display style in the region map, the target display style being used for distinguishing between other regions that are displayed in the region map and not adapted to the skill type; and receiving, in response to a selection operation for a target region in the at least one region, the target skill casting instruction.

12. The method according to claim 7, wherein the receiving the target skill casting instruction based on a target skill control in the presented skill controls comprises:

displaying an object model of the target virtual object in the region map;

in response to a trigger operation for the target skill control, displaying at least one alternative region in the region map;

in response to a selection operation for a target region in the at least one region, controlling the object model of the target virtual object to move towards the target region;

when the object model of the target virtual object moves to the target region, displaying prompt information for inquiring whether to cast skills; and in response to a determining operation for the prompt information, receiving the target skill casting instruction.

13. The method according to claim 1, wherein the controlling a target skill indicated by the target skill casting instruction to be cast in the target region comprises:

displaying an object model of the target virtual object in the region map; and controlling the object model of the target virtual object to move to the target region, and controlling the object model of the target virtual object to cast a target skill corresponding to the target skill control in the target region.

14. An electronic device, comprising:

a memory, configured to store executable instructions; and a processor, configured to implement, when executing the executable instructions stored in the memory, a virtual skill control method including:

display an electronic game interface when logging into an electronic game;

displaying a region map of a virtual scene, wherein the region map comprises a target region;

displaying a virtual object list of a current login account; and displaying a plurality of virtual objects configured by the current login account in the virtual object list, the plurality of virtual objects comprising at least one virtual object having target skills, the at least one virtual object comprising a target virtual object;

in response to a clicking/tapping operation on a virtual object group, presenting a target virtual object having target skills in the virtual object group, and presenting at least one target skill possessed by the target virtual object, wherein the target skills are castable in a world map and are configured for virtual troops in a virtual team;

when a user selects to click/tap a skill control corresponding to a target skill, presenting a detail page corresponding to the target skill, and presenting a skill description and a use function item for the target skill on the detail page;

when the user clicks/taps the use function item, presenting prompt information in response to the clicking/tapping operation;

when the user selects the target region in the world map based on the prompt information, receiving a target skill casting instruction for the target region, and controlling, in response to the target skill casting instruction, the target skill to be cast in the target region;

in response to a target skill casting instruction of the target virtual object for the target region in the region map, controlling a target skill indicated by the target skill casting instruction to be cast in the target region and to act on at least one virtual object in the target region;

wherein the virtual troops use the target skill to interact with a target object in the target region of the world map, so that an interaction process is displayed in the world map;

wherein an effect of the target skill is synchronously displayed in the target region and the region map in real time, wherein, when a virtual object group comprises at least two virtual objects and different virtual objects have different object attributes, the method further comprises:

displaying an exchange function item for exchanging the object attributes;

in response to a trigger operation for the exchange function item, controlling each virtual object in the virtual object group to be in a candidate state; and in response to a selection operation for a first virtual object and a second virtual object in the candidate state, controlling the first virtual object and the second virtual object to exchange the object attributes.

15. The electronic device according to claim 14, wherein the displaying at least one virtual object having target skills in the region map comprises:

displaying at least one virtual object group, the virtual object group comprising at least one virtual object; and in response to a trigger operation for a target virtual object group in the at least one virtual object group, displaying at least one virtual object having target skills in the target virtual object group.

16. The electronic device according to claim 14, wherein the method further comprises:

in response to a trigger operation for the target virtual object, displaying a skill control of at least one target skill possessed by the target virtual object, the skill controls having a one-to-one correspondence with the target skills; and receiving the target skill casting instruction based on a target skill control in the presented skill controls.

17. A non-transitory computer-readable storage medium, storing executable instructions that, when executed by a processor of an electronic device, cause the electronic device to perform a virtual skill control method including:

display an electronic game interface when logging into an electronic game;

displaying a region map of a virtual scene, wherein the region map comprises a target region;

displaying a virtual object list of a current login account;

displaying a plurality of virtual objects configured by the current login account in the virtual object list, the plurality of virtual objects comprising at least one virtual object having target skills, the at least one virtual object comprising a target virtual object;

in response to a clicking/tapping operation on a virtual object group, presenting a target virtual object having target skills in the virtual object group, and presenting at least one target skill possessed by the target virtual object, wherein the target skills are castable in a world map and are configured for virtual troops in a virtual team;

when a user selects to click/tap a skill control corresponding to a target skill, presenting a detail page corresponding to the target skill, and presenting a skill description and a use function item for the target skill on the detail page;

when the user clicks/taps the use function item, presenting prompt information in response to the clicking/tapping operation;

when the user selects the target region in the world map based on the prompt information, receiving a target skill casting instruction for the target region, and controlling, in response to the target skill casting instruction, the target skill to be cast in the target region;

in response to a target skill casting instruction of the target virtual object for a target region in the region map, controlling a target skill indicated by the target skill casting instruction to be cast in the target region and to act on at least one virtual object in the target region, wherein an effect of the target skill is synchronously displayed in the target region and the region map in real time, wherein, when a virtual object group comprises at least two virtual objects and different virtual objects have different object attributes, the method further comprises:

displaying an exchange function item for exchanging the object attributes;

in response to a trigger operation for the exchange function item, controlling each virtual object in the virtual object group to be in a candidate state; and in response to a selection operation for a first virtual object and a second virtual object in the candidate state, controlling the first virtual object and the second virtual object to exchange the object attributes.

* * * * *